United States Patent [19]

Fourrey et al.

[11] Patent Number: 5,052,748
[45] Date of Patent: Oct. 1, 1991

[54] SEAT WITH A TILTING AND FOLDING BACK

[75] Inventors: Francois Fourrey, Montbeliard; Jean F. Mauffrey, Danjoutin, both of France

[73] Assignee: ECIA, France

[21] Appl. No.: 472,547

[22] Filed: Jan. 30, 1990

[30] Foreign Application Priority Data

Jan. 31, 1989 [FR] France ................. 89 01194

[51] Int. Cl.⁵ ............................................ A47B 85/04
[52] U.S. Cl. .................................... 297/124; 297/379
[58] Field of Search ............... 297/124, 129, 125, 118, 297/379

[56] References Cited

U.S. PATENT DOCUMENTS

| 4,132,447 | 1/1979 | Terada | 297/379 X |
| 4,268,086 | 5/1981 | Okuyama | 297/379 X |
| 4,484,776 | 11/1984 | Gokimoto et al. | 297/379 X |
| 4,484,779 | 11/1984 | Suzuki | 297/379 X |
| 4,629,252 | 12/1986 | Myers et al. | 297/379 X |
| 4,874,205 | 10/1989 | Arefinejad et al. | 297/379 |

FOREIGN PATENT DOCUMENTS 3222274  2/1983  Fed. Rep. of Germany ...... 297/379

Primary Examiner—Jose V. Chen
Attorney, Agent, or Firm—Sughrue, Mion, Zinn Macpeak & Seas

[57] ABSTRACT

The seat in which the back (12) may be tilted relative to the base (11) comprises a support (120) and a frame (20) with end plates (21, 22) between which is interposed a tilt-adjustment device (30) and a pivot mechanism (50) with a cheek (51) between support (120) and end plate (22), a lock (52) for holding back the back, a linkage piece (53) connecting this device (30) and this lock (52) and a safety device (54) preventing the back from folding down into a virtually horizontal shelf unless the back is placed in the upright position beforehand.

Application to the seats of motor vehicles.

9 Claims, 6 Drawing Sheets

SEAT WITH A TILTING AND FOLDING BACK

BACKGROUND OF THE INVENTION

The invention relates to seats, and more particularly seats of cars provided with a base and with a back which can be tilted back and folded forward as desired.

In the automobile industry, it is traditional to equip vehicles with front seats in which the back can tilt relative to the base. These backs can, usually, be tilted backwards so as to improve the comfort of the occupants when driving or when resting. Sometimes the tilting of the backs may even be total, backwards virtually to the horizontal, so as to convert the seat into a bunk. In other cases, the back can also be pivoted completely forwards so as to bear against the base so as to free a substantial space.

As is known, in order to achieve the above whilst respecting safety, the back must be articulated relative to the base using a device for adjusting the tilting which must be absolutely effective, in other words once the choice of the relative tilting has been made, the back cannot alter its orientation even in the event of violent forces such as those which may result from an impact. A device for adjusting the tilting which meets the criteria thus briefly mentioned is, for example, that which is described in French Patent 2,463,596.

Although this type of seat is in general satisfactory to users, it is, however, not universally usable. For in some circumstances it is necessary or useful, or even desirable, to be able to have available an approximately horizontal shelf.

SUMMARY OF THE INVENTION

The object of the invention is provide for the back of a seat, in particular for a motor vehicle, to not only tilt relative to the base but also to pivot so as to make it possible to convert it into a shelf.

The subject of the invention is a seat, in particular for a motor vehicle, equipped with a base and with a back which can tilt relative to the latter between an upright position and other tilted positions which can be altered as desired and which comprises, inter alia, a frame made from end plates for accommodating the base and from end plates for accommodating the back fastened to a frame, between which is inserted an articulation with a tilt-adjustment device provided with a control in order to move it between a usual blocked locking position, towards which it is normally stressed in order to immobilize this back and this base relative to each other, and a transitional released free position in order to allow adjustment of the tilting of this back relative to this base, and a pivot mechanism which is placed between one of the end plates and the support for the back in order to make the back capable of moving between a first, normal, position, in order to serve as a back rest, and a second, folded, position, in order to serve as a shelf, and which is provided with at least one cheek carried by the support and mounted on one of the end plates of the back so as to be capable of rotating about an axis between these first and second positions, with a lock with a catch and a slide which is combined with this cheek and this end plate and which can move between an active position, towards which it is normally stressed in order to immobilize the back in one or other of its two positions, normal and folded, and an inactive position in order to enable the back to tilt, with a linkage piece connecting and controlling the device tilt-adjustment and the lock either in order to act on the adjustment device in order to move it from one to the other of its positions, usual and transitional, or in order to act on the lock in order to move it from its active position to its inactive position, and with a safety device which is mounted on this end plate in order to interact with the other end plate which is combined with it and which acts on this cheek in order to allow the pivoting of the back from the first, normal, position to the second, folded, position only when the back is in its upright position beforehand.

Other features of the invention will emerge upon reading the description and the claims which follow and upon examining the attached drawing given merely by way of example in which:

DETAILED DESCRIPTION OF A PREFERRED EMBODIMENT

Since seats with a base and a back which can tilt relatively, in particular for a motor vehicle, are well known in the prior art, only that which relates directly or indirectly to the invention will be described in what follows. For the remainder, the person skilled in the art in question will draw from the current conventional solutions at his disposal in order to deal with the particular problems with which he is confronted.

In what follows, an equivalent element will be always be designated by an identical reference numeral, whatever the embodiment.

As can be seen with reference to the various figures of the drawing, a seat 10 with a base 11 and a back 12 according to the invention is provided with a frame 20 with which is combined a device for adjusting the tilting 30. As result of this device, for example of the type given in the abovementioned patent, it is possible to tilt the back between a virtually vertical upright position and other tilted positions which can be altered as desired. This seat is also equipped with a pivot mechanism 50 in order to make the back itself capable of moving between a first, normal, position where the front surface of the back serves as a back rest for its occupant and a second, folded, position where the rear surface of this back serves as a shelf.

Since the actual bases 11 and backs 12 are of any appropriate conventional type, they have only been illustrated very diagrammatically and very partially so as not to clutter up the drawing.

For the sake of explanatory convenience, each of the components of such a seat according to the invention will be described successively before explaining their operation.

The base 11 and the back 12 are intended to be carried by the frame 20. This frame 20 comprises lateral end plates 21 intended to accommodate the base and lateral end plates 22 for accommodating the actual back which is, for its part, fastened to a support 120.

As is conventional, the end plates 21 intended to accommodate the base are mounted on a vehicle floor via, for example, runners which enable the longitudinal, and optionally vertical, position of the seat to be adjusted. This floor and these runners are not shown.

For reasons which will become clear later, at least one of the end plates 21 is provided with a notch 211 and at least one of the end plates 22 is pierced with an orifice 221, with a slot 222, and with an opening 223 and carries a guide 224; this is plainly illustrated in the figures of the drawing.

The end plates 21 and 22 of the frame 20 are joined by an articulation with a tilt-adjustment device. As can be seen, in this particular case a device 30 is used of the type described in the abovementioned patent but it is clear that any other type of similar device may be used. It will be recalled that the device of this document comprises a control 31 such as a shaft equipped with a crank 310 which terminates in an end 311. It also comprises an internally toothed drum and a return spring 33 acting on cams. The drum, not shown, is carried by the end plates 21 and the cams, not shown, combined with the end plates 22 are provided with teeth which interact with the internally toothed drum; they are stressed by the spring 33 into a usual blocked position which locks the relative positions of the base and of the back. As result of the control 31, it is possible for another transitional released position to be assumed where the cams and the drum no longer engage but are free and which allows the position of the back to be tilted relative to the base as desired. The maximum tilting amplitude which the back can assume between the completely upright position and the extreme tilted position is fixed by a stopping means 35 which consists, for example, of a block 350 carried by at least one of the end plates 21 and of stops 351 and 352 carried by the corresponding end plate 22. A return spring 36 normally stresses the back towards its upright position. If necessary, a transmission 37 connects the control 31 to a similar control of another device placed on the other opposite side, as illustrated.

As indicated above, the seat according to the invention also comprises a pivot mechanism 50 placed between at least one of the end plates 22 of the back and the support 120 of the latter so as to make the actual back capable of moving between a first, normal, position where its front surface can serve as a back rest and a second, folded, position where its rear surface can serve as a shelf. This mechanism comprises, inter alia, at least one cheek 51, a lock 52, a linkage piece 53 and a safety device 54.

As can be seen, the cheek 51 is held fast by the support 120 and mounted on the end plate 22 so as to be able to rotate between its first and second positions. This cheek pivots about an axis 510 and comprises a piece 511 in the shape of a sector of a circle, centred on this axis, the peripheral edge of which carries recesses 512 and 513 which have a base 514 and flanks 515. The piece 511 is, in addition, provided with a heel 516. This is illustrated and will be returned to later.

The lock 52, which comprises a catch and a slide, is combined with this cheek 51 and this end plate 22. This lock can move between a first active position in order to immobilize the back in one or the other of its first and second positions and a inactive position in order to enable the actual back to pivot. This lock comprises a lever 520 capable of pivoting about a pin 521 of the end plate 22. This lever has a nose 522 and an operating arm 523 and carries a roller 524. A spring 525 normally stresses the lever, in other words the lock, towards its first position.

This lever forms the slide or bolt of the lock, whereas the catch of the latter with which it interacts is formed by the piece in the shape of a sector of a circle of the cheek. The nose 522 is intended to engage in one or other of the recesses 512, 513.

The linkage piece 53 which connects and controls the tilt-adjustment device 30 and the lock 52 comprises an angled bracket 530, relatively curved out, mounted so as to pivot about a pin 531 of the end plate 22. This angled bracket terminates in a clamp 532 and is pierced by a bent elongate opening 533. For reasons which will be mentioned later, this clamp is intended to accommodate the end 311 of the crank 310 and the elongate opening 533 is intended to accommodate the roller 524. As a result, when the operating arm 523 is acted upon, it is possible to move either the shaft of the adjustment device in order to move it from one to the other of its positions, usual and transitional, or the lock in order to move it from its first active position to its inactive position.

The safety device 54 comprises a latch 540 mounted so as to pivot about a pin 541 of the end plate 22. This latch carries a tooth 542 and a toe 543. This latch is stressed by a spring 544. For reasons which will be mentioned later, the tooth 542 is intended to interact with the notch 211 of the end plate 21 and the toe 543 with one of the flanks 515 of the recess 513 of the deformed piece 510 of the cheek 51. This latch is held in place by the guide 224 of the end plate 22 and stressed by the spring 544 in an anti-clockwise direction (in FIG. 3).

All the components of the seat according to the invention which have thus been described with regard to the figures of the drawing are joined, assembled and mounted as is illustrated plainly in the figures of the drawing. As can be seen, the orifice 221 of the end plate 22 is traversed by the lock 52, bent-back so as to enable it to change plane and the curved slot 222, centred on the pin 521, is traversed by the roller 524 in order to enable it to meet the heel 516 of the piece of the cheek 51. Similarly, the opening 223 enables the safety device 54 to change plane so that its toe 543 can interact with the flank 515 of the recess 513 of the piece of the cheek. The guide 224 covers the safety device 54 so that the latter can pivot whilst remaining in its plane. The various springs are secured, as illustrated, on lugs, tongues or similar so as to exert forces on the pivoting elements to which they are fastened in order to stress them in the appropriate particular directions.

The operation of the seat according to the invention will now be explained.

Figure 1:
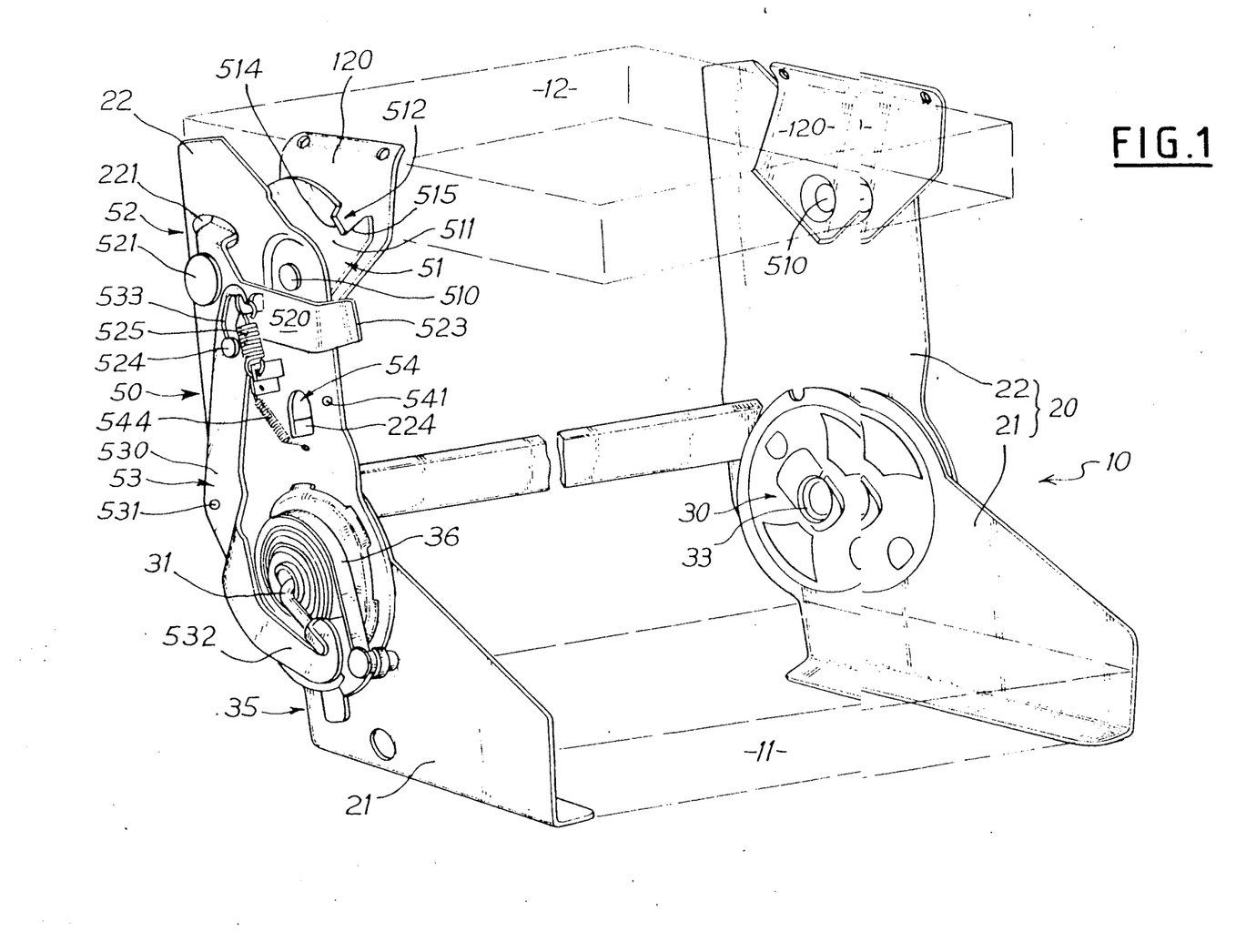
FIG. 1 is a diagrammatic perspective view of an embodiment of a seat according to the invention observed from the right-hand side.
Figure 2:
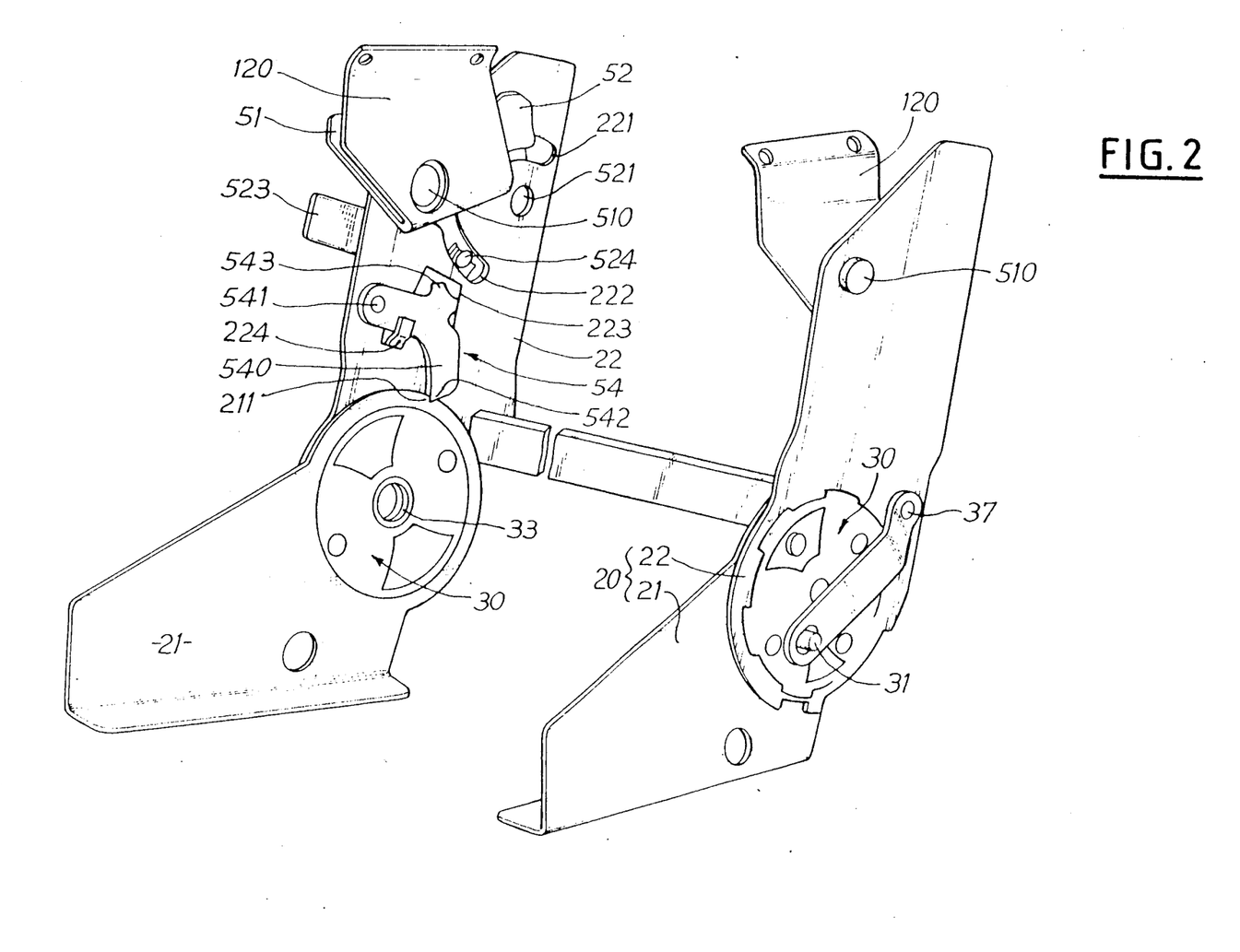
FIG. 2 is a view similar to that in FIG. 1 but from the left-hand side.
Figure 3:
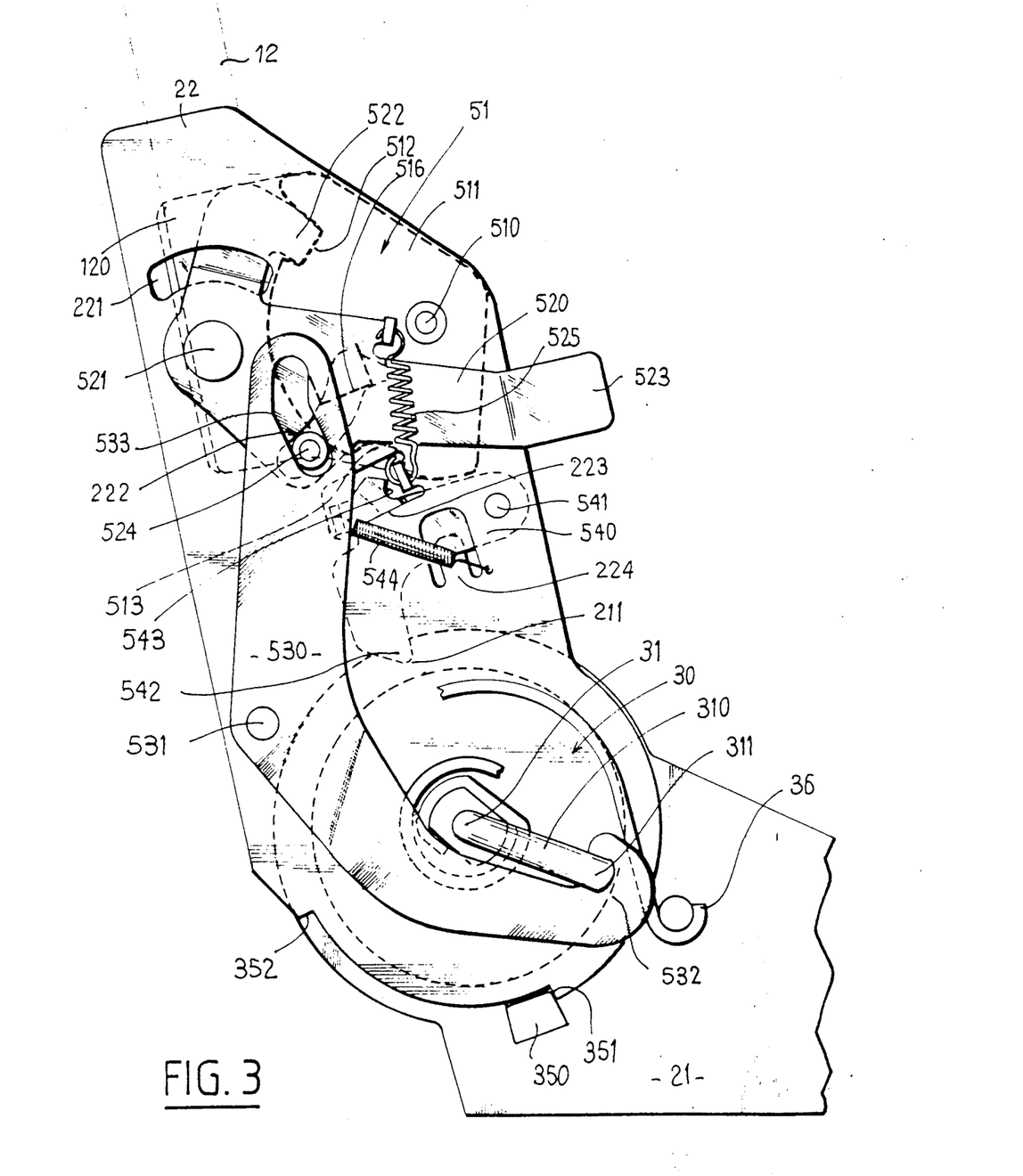
FIG. 3 is a partial elevation of the seat in FIG. 1 showing its structure.

It is assumed that the back of the seat according to the invention is initially fully upright, as illustrated in FIG. 3; the components are in the positions shown.

It is then desired to alter the tilt of the back. In order to do this, the arm 523 of the lever 520 of the lock 52 is gripped and raised so as to rotate about the pin 521. Whilst rising, the roller 524 slides in the bent elongate opening 533 of the angled bracket 530 of the linkage piece 53. The angled bracket also pivots in a clockwise direction about its pin 531 and therefore displaces the end 311 of the crank 310 combined with the shaft of the control 31 of the tilt-adjustment device which is trapped in the clamp 532. As a consequence of this, this device is moved from its usual blocked locking position, towards which it is normally stressed, to its transitional released adjusting position where the cams and the toothed drum are disconnected. At the same time, the roller 524 bears against the heel 516 of the deformed piece 511 combined with the cheek 51. The end plates 22 of the back are then disconnected from those 21 of the base. The back can now been tilted into the desired position by applying pressure to the upper part of the back 12 counter to the spring 36; as a consequence of this, the back is prevented from pivoting in a clockwise direction and the heel 516 retains the roller 524, thus preventing the lever 520 from exceeding the position shown in FIG. 4. When the desired position has been reached, the arm 523 is released. The springs 33 and 525 then operate in order to return the elements to their respective starting positions.

Figure 4:
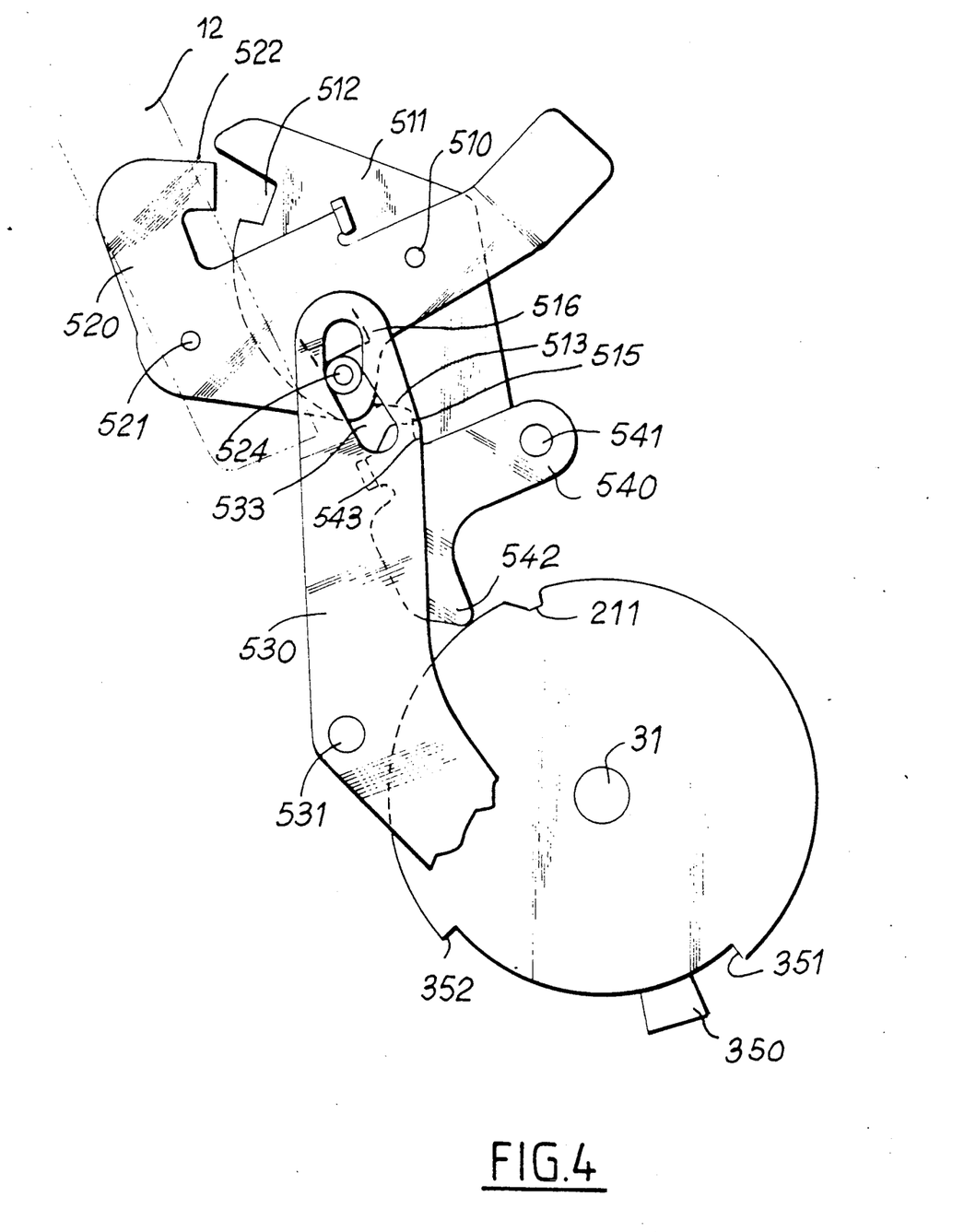
FIG. 4 is a view similar to that in FIG. 3 in a different position.

Once this has been achieved, the position illustrated in FIG. 4 has been reached. As can be observed, the tooth 542 of the latch 540 of the safety device 54 which was initially engaged in the notch 211 of one of the end plates 21 has left the latter and now bears against the periphery of the ring of the toothed drum of the device 30. Simultaneously, by pivoting about its pin 514, the latch 540 rotating in a clockwise direction, has placed its toe 543 against the flank 515 of the recess 513. If the arm 523 of the lever 520 is now raised and held in its up position where its nose 522 is freed from the recess 512, it is impossible to pivot the back since the cheek 51 can no longer rotate about the axis 510 as result of the contact of this toe and this flank; the mechanism is inoperative. There is therefore no danger that the tilted back is inadvertently placed in the folded shelf position.

Figure 5:
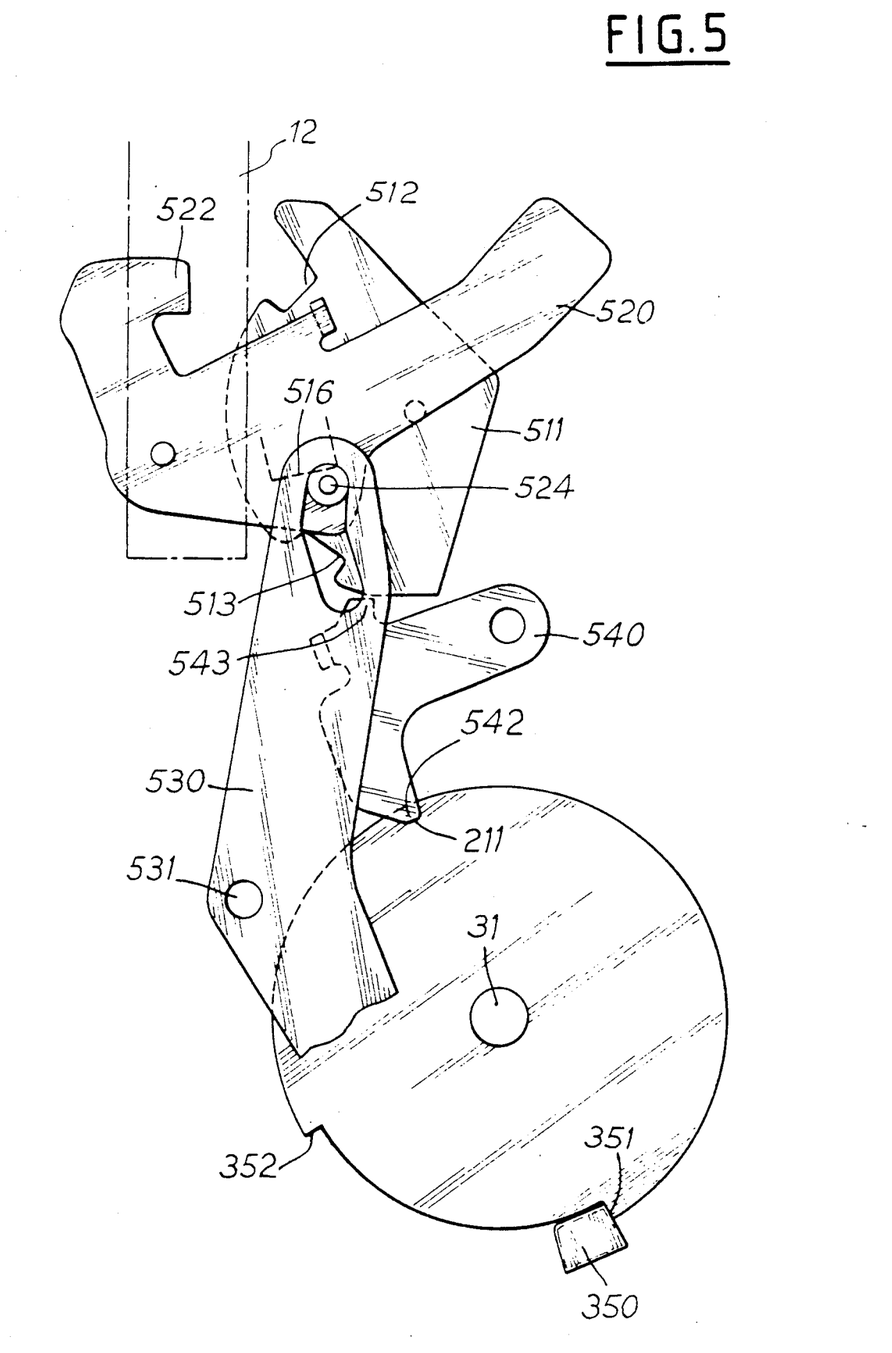
FIG. 5 is a view similar to that in FIG. 3 in another position.

Reference will now be made to FIG. 5 where the seat has been illustrated with the back upright, at the moment where the actual back is about to be folded into a shelf. In order to do this, the arm 523 of the lever of the lock is gripped and is raised to its furthest extent in an anti-clockwise direction. It will be observed firstly that the latch 540 of the safety device 54 is in a position such that its tooth 542 is engaged in the notch 211 of the end plate 21. The toe 543 is thus not opposite the flank 515 of the recess 513 and can in no way hinder any possible rotation of the cheek. By raising the arm 523 of the lever 520, the latter is caused to pivot in an anti-clockwise direction so that its nose 522 separates from the recess 512. Simultaneously, the roller 524 bears against the heel 516 of the cheek and initiates a pivoting of the back about its axis 510. The upper end of the back then need only be gripped in order to continue the forward movement thus initiated.

Figure 6:
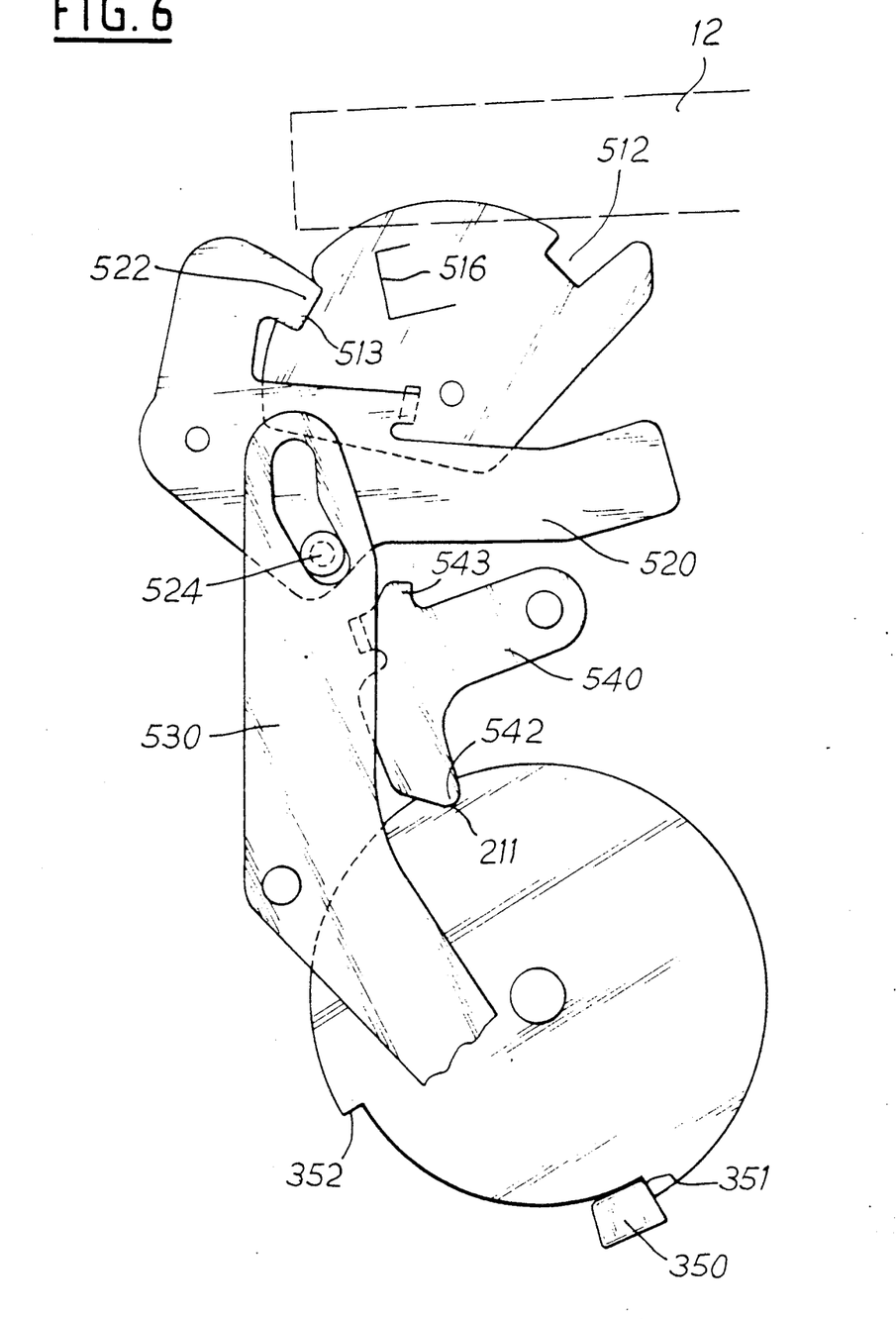
FIG. 6 is a view similar to that in FIG. 3 where the back is in its position where it is folded into a shelf.

When this movement is complete and when the rear surface of the back which serves as a shelf is virtually horizontal, the seat occupies the position in which it is illustrated in FIG. 6. It can now be seen that the nose 522 of the lever 520 is engaged in the other recess 513 of the cheek in order to fix definitively the position of the shelf, after the operating arm 523, returned by its spring 525, has been released.

The various components of the seat according to the invention are, for example, made from steel metal sheets of appropriate grades which are shaped, for example, by cutting and stamping, as is conventional. It has been suggested for the geometrical axis of pivoting or rotation to be pins but it is clear that any other solutions, such as screws, bolts, rivets or similar, are also suitable.

The actual back and base of the seat are of any conventional type. This is why they are only illustrated very diagrammatically in broken lines.

In the above, only the components which are located on the right-hand side of the seat have been described. It is clear that the components on the left-hand side may be the same, with the exception of possible transposition as result of symmetry, or be simplified. In particular, the operating lever 520 and the latch 540 can be omitted. However, in order to ensure the control of the device for adjusting the tilting 30 on the left-hand side, a simple transmission 37 is then used, consisting of a transverse rod, integral with the pin 513 which will carry the necessary means for driving the crank.

The entire advantage of the seat according to the invention can therefore been seen, which not only enables the provision of a tilting back but also of a back that can fold flat, the rear surface of which can then serve as a shelf.

What is claimed is:
1. A seat (10) comprising, in combination;
   a base (11);
   a back (12) carried by a back support (120) tiltable relative to said base (11) between an upright position and other tilted positions changeable at will;
   a frame (20) having on each of two opposite sides thereof a pair of end plates, each pair having a first end plate (21), for accommodating said base (11), and a second end plate (22) for accommodating said back support (120); 'tilt-adjustment means (30) inserted between said first and second end plates (21, 22) and movable between a normal blocked locking position, toward which said means (30) is normally biased in order to fix a relative position of said back (12) and base (11), and a transitional released free position to allow an adjustment of a tilted position of said back (12) relative to said base (11), said tilt-adjustment means (30) being provided with a control means (31) for changing the position of said tilt-adjustment means; and
   a pivot mechanism means (50), placed between said second end plate (22) and back support (120), for making said back (12) movable between a first normal position, where said back (12) serves as a back rest, and a second folded position where said back (12) serves as a shelf;
   said pivot mechanism means (50) comprising:
   at least one cheek (51) carried by said back support (120) and rotatably mounted on said second end plate (22) for rotation about an axis between said first and second positions;
   a lock means (52) having a catch and a bolt cooperating with said cheek (51) and said second end plate (22) and movable between a first active position, toward which it is normally biased to fix said back (12) in one of its said first normal and second folded positions, and a second inactive position to tilt said back (12);
   a linkage means (53) connecting and controlling said tilt-adjustment means (30) and said lock means (52) either in order to act on said control means (31) to move said tilt-adjustment means (30) from one to the other of its said usual and transitional positions, or in order to act and move said lock means (52) from its said active position to its said inactive position; and safety device means (54), pivotally mounted on said second end plate (22), and biased by a spring (544) for contacting and cooperating with said first end plate (21) and for acting on said cheek (51) to lock said cheek (51) and prevent any rotation thereof which would place said back (12) in its said shelf second folded position when said back (12) is not placed in its upright position beforehand.

2. Seat according to claim 1, wherein said catch of said lock means is fixedly mounted on said cheek (51), and said bolt of said lock means is articulatedly mounted on said second plate (22).

3. Seat according to either of claims 1 or 2, wherein the catch of the lock means (52) comprises a deformed piece (511) in the shape of a sector of a circle centered on said axis (510), and wherein said deformed piece has a peripheral edge which carries recesses (512, 513) defining the first normal position and the second folded position, respectively.

4. Seat according to claim 3, wherein the bolt of the lock means (52) comprises a lever (520) mounted so as to pivot about a pin (521) of the second end plate (22), said lever having a first end, which carries a nose (522) adapted to engage in the recesses (512, 513), and an opposite end which carries an operating arm (523).

5. Seat according to claim 4, wherein the linkage means (53) comprises an angled bracket (530) articulated about a pin (531) of the second end plate (22), one of two opposite ends of said bracket (530) being provided with a clamp (532), adapted to be connected to the control means (31), and having an elongate opening (533) adapted to accommodate a roller (524) carried by the bolt of the lock means (52).

6. Seat according to claim 4, wherein the safety device means (54) comprises a latch (540) which is mounted pivotably on a pin (541) of the second end plate (22), which has a tooth (542) adapted to interact with a notch (211) of the first end plate (21), and which has a toe (543) adapted to interact directly or indirectly with said cheek (51).

7. Seat according to claim 1 or 2, wherein the linkage means (53) comprises an angled bracket (530) articulated about a pin (531) of the second end plate (22), one of two opposite ends of said bracket (530) being provided with a clamp (532), adapted to be connected to the control means (31), and having an elongate opening (533) adapted to accommodate a roller (524) carried by the bolt of the lock means (52).

8. Seat according to claim 7, wherein the safety device means (54) comprises a latch (540) which is mounted pivotably on a pin (541) of the second end plate (22), which has a tooth (542) adapted to interact with a notch (211) of the first end plate (21), and which has a toe (543) adapted to interact directly or indirectly with said cheek (51).

9. Seat according to claim 1 or 2, wherein the safety device means (54) comprises a latch (540) which is mounted pivotably on a pin (541) of the second end plate (22), which has a tooth (542) adapted to interact with a notch (211) of the first end plate (21), and which has a toe (543) adapted to interact directly or indirectly with said cheek (51).

* * * * *